(12) United States Patent
Pechtold et al.

(10) Patent No.: US 7,320,840 B2
(45) Date of Patent: Jan. 22, 2008

(54) COMBINATION OF INJECTOR-EJECTOR FOR FUEL CELL SYSTEMS

(75) Inventors: Rainer Pechtold, Russelsheim (DE); James S. Siepierski, Williamsville, NY (US)

(73) Assignee: General Motors Corporation, Detroit, MI (US)

( * ) Notice: Subject to any disclaimer, the term of this patent is extended or adjusted under 35 U.S.C. 154(b) by 491 days.

(21) Appl. No.: 10/900,593

(22) Filed: Jul. 28, 2004

(65) Prior Publication Data
US 2006/0024548 A1 Feb. 2, 2006

Related U.S. Application Data

(60) Provisional application No. 60/487,997, filed on Jul. 17, 2003.

(51) Int. Cl.
*H01M 2/00* (2006.01)
*H01M 8/04* (2006.01)

(52) U.S. Cl. .......................... 429/34; 429/25

(58) Field of Classification Search ................ 429/34, 429/25
See application file for complete search history.

(56) References Cited

U.S. PATENT DOCUMENTS

| | | | |
|---|---|---|---|
| 5,441,821 A | 8/1995 | Merritt et al. | 429/17 |
| 7,037,609 B2 | 5/2006 | Sugawara et al. | |
| 7,105,243 B2 * | 9/2006 | Morishima et al. | 429/25 |

FOREIGN PATENT DOCUMENTS

DE   102 51 878 A1   7/2003

* cited by examiner

*Primary Examiner*—Patrick Joseph Ryan
*Assistant Examiner*—Thomas H. Parsons

(57) ABSTRACT

A fuel cell system including a combined injector/ejector system. The pressure of a hydrogen gas being injected into the fuel cell system by the injector acts as a pump that draws an anode exhaust gas being carried by the ejector back into the fuel cell system. The respective gases mix together in proximity to the ejector prior to being introduced back into the fuel cell system. A pressure controller can be provided to control the pressure of the hydrogen gas applied to the injector to more effectively draw the anode exhaust gas. In this manner, the need for a separate pump for the ejector, and the energy required for its operation, is eliminated or at least lessened, thus increasing the overall energy efficiency of the fuel cell system.

27 Claims, 12 Drawing Sheets

COMBINATION OF INJECTOR-EJECTOR FOR FUEL CELL SYSTEMS

CROSS-REFERENCE TO RELATED APPLICATIONS

This application claims the benefit of the filing date of U.S. Provisional Application 60/487,997, titled "Combination of Injector/Ejector for Fuel Cell Systems," filed Jul. 17, 2003.

BACKGROUND OF THE INVENTION

1. Field of the Invention

The present invention relates generally to fuel cell systems and, more particularly, to a new and improved fuel cell system having a combined injector/ejector system.

2. Discussion of the Related Art

A fuel cell is a device that generates electricity by a chemical reaction. Every fuel cell has two electrodes, one positive and one negative, called, respectively, the cathode and the anode. The reactions that produce electricity take place at the electrodes. Every fuel cell also has an electrolyte, which carries electrically charged particles from one electrode to the other, and a catalyst, which speeds the reactions at the electrodes. Hydrogen is the basic fuel, but fuel cells also require oxygen. One advantage of fuel cells is that they generate electricity with very little pollution, i.e., much of the hydrogen and oxygen used in generating the electricity ultimately combine to form a harmless byproduct, namely water.

With respect to fuel cell operation, in general terms, hydrogen atoms enter a fuel cell at the anode where a chemical reaction strips them of their electrons. The hydrogen atoms are now "ionized," and carry a positive electrical charge. The negatively charged electrons provide the current through wires to do work. If alternating current (AC) is needed, the DC output of the fuel cell must be routed through a conversion device called an inverter.

Oxygen enters the fuel cell at the cathode and, in some cell types, it combines with electrons returning from the electrical circuit and hydrogen ions that have traveled through the electrolyte from the anode. In other cell types, the oxygen picks up electrons and then travels through the electrolyte to the anode, where it combines with hydrogen ions. The electrolyte permits only the appropriate ions to pass between the anode and cathode. If free electrons or other substances could travel through the electrolyte, they would disrupt the chemical reaction.

Whether they combine at the anode or the cathode, together hydrogen and oxygen form water, which drains from the cell. As long as a fuel cell is supplied with hydrogen and oxygen, it will generate electricity.

In a conventional fuel cell system, a mixture of gases, such as $H_2$, $H_2O$ and $N_2$, are transported from the anode outlet back to the anode inlet of the fuel cell system (e.g., a "stack" of individual fuel cells). Generally speaking, an injector is typically associated with the inlet side and an ejector is typically associated with the outlet side.

In one method, injectors and ejectors are constructed and deployed for fuel injection and anode gas re-circulation as separate and spaced components, the two being in fluid communication by virtue of a conduit/piping system. Re-circulation motive force is taken from fuel cell tank pressure energy, and is regulated to track and motivate anode re-circulation load. Anode re-circulation load comes from nitrogen (carried over from the cathode side) and from water (reaction product). Nitrogen must be removed from the loop by venting. Since this method tracks hydrogen pressure solely with nitrogen loading, hydrogen venting increases with nitrogen venting. Reduced fuel utilization is therefore a major disadvantage of this ejector re-circulation method where nitrogen is present in the anode gas.

In another method that is an alternative to the ejector method discussed above, a pumping device can be employed to deliver the respective gases back into the inlet of the fuel cell system. This method has the utilization advantage that hydrogen pressure tracks only the engine power fuel requirement. However, pumping power increases with re-circulation load, thus detracting from the overall energy efficiency of the fuel cell system.

Therefore, a need exists for a new and improved fuel cell anode gas re-circulation system, wherein the injector and the ejector are configured in such a manner so as to improve both the overall operation and energy efficiency of the fuel cell system.

SUMMARY OF THE INVENTION

In accordance with the general teachings of the present invention, a new and improved fuel cell system is provided. More specifically, a new and improved injector/ejector system for the fuel cell system is provided. The injector and the ejector are combined together into a system in cooperation with instrumentation and controls, one or more optional adaptors, couplings, seals, and other suitable components.

By way of a non-limiting example, the injector and ejector can be coupled to different apertures or bores of a coupling having a common passageway. A pressurized gas, such as hydrogen, would then be introduced in a selectively controlled pulsed manner by the injector into the common passageway of the coupling. The injector is upstream of the inlet side of the fuel cell system. One or more gases from the outlet side of the fuel cell system are carried by the ejector, which is in communication with the common passageway, and would then be drawn into the common passageway by the action of the pulsed injection of the gas by the injector. These gases would then mix in the common passageway in proximity to the ejector, and would be subsequently introduced into the fuel cell system by the action of the pressure exerted by the injector.

According to one embodiment of the present invention, the injector/ejector system includes a hydrogen supply pressure controller for controlling the pressure of the hydrogen supply from a pressurized tank to the injector within the injector/ejector system. The density and constituency of the anode exhaust gas from the fuel cell system is sensed by a suitable sensor, and the pressure of the hydrogen applied to the injector is increased or decreased accordingly by the pressure controller so that the hydrogen supply flow effectively draws the exhaust gas through the anode exhaust outlet. In this embodiment, a pin-hole orifice is provided adjacent to the pressurized tank so that if the high-pressure conduit between the tank and the pressure controller is ruptured, a minimal amount of hydrogen will escape from the tank before the leak can be detected and the regulator turned off.

In accordance with one embodiment of the present invention, a combined injector/ejector system for a fuel cell system is provided, comprising: (1) a gas injection system; (2) a gas ejection system; and (3) a member having an area defining a passageway contained therein, the gas injection system and the gas ejection system in fluid communication with the passageway; wherein the injection system is operable to selectively inject a first gas into the passageway to form a pulsed first gas stream; wherein a second gas is drawn into the passageway in response to the pulsed first gas stream to form a pulsed second gas stream.

In accordance with a first alternative embodiment of the present invention, a combined injector/ejector system for a fuel cell system is provided, comprising: (1) a source of a first gas; (2) an injection system in fluid communication with the source of the first gas; (3) a source of a second gas; (4) an ejection system in fluid communication with the source of the second gas; and (5) a member having an area defining a passageway contained therein, the injection system and the ejection system in fluid communication with the passageway; wherein the injection system selectively injects the first gas into the passageway to form a pulsed first gas stream; wherein the second gas is drawn into the passageway in response to the pulsed first gas stream to form a pulsed second gas stream; wherein the pulsed first gas stream and the pulsed second gas stream combine to form a gas mixture.

In accordance with a second alternative embodiment of the present invention, a combined injector/ejector system for a fuel cell system is provided, comprising: (1) a pressurized source of a first gas; (2) an injection system in fluid communication with the pressurized source of the first gas; (3) a source of a second gas; (4) an ejection system in fluid communication with the source of the second gas; and (5) a member having an area defining a first bore, an area defining a second bore, and an area defining a passageway contained therein, the passageway in fluid communication with the first bore and the second bore, the injection system and the ejection system in fluid communication with the passageway, the injection system in physical cooperation with the first bore, and the ejection system in physical cooperation with the second bore; wherein the injection system selectively injects the first gas into the passageway to form a pulsed first gas stream; wherein the second gas is drawn into the passageway in response to the pulsed first gas stream to form a pulsed second gas stream; wherein the pulsed first gas stream and the pulsed second gas stream combine to form a gas mixture.

In accordance with a third alternative embodiment of the present invention, a fuel cell system is provided, comprising: (1) at least one fuel cell having an inlet and an outlet; (2) a source of a first gas; (3) an injection system in fluid communication with the source of the first gas and the inlet of the fuel cell; (4) a source of a second gas; (5) an ejection system in fluid communication with the source of the second gas and the outlet of the fuel cell; and (6) a member having an area defining a passageway contained therein, the injection system and the ejection system in fluid communication with the passageway; wherein the injection system selectively injects the first gas into the passageway to form a pulsed first gas stream; wherein the second gas is drawn into the passageway in response to the pulsed first gas stream to form a pulsed second gas stream; wherein the pulsed first gas stream and the pulsed second gas stream combine to form a gas mixture; wherein the gas mixture is introduced into the inlet of the at least one fuel cell.

In accordance with a fourth alternative embodiment of the present invention, a fuel cell system is provided, comprising: (1) at least one fuel cell having an inlet and an outlet; (2) a pressurized source of a first gas; (3) an injection system in fluid communication with the pressurized source of the first gas and the inlet of the fuel cell; (4) a source of a second gas; (5) an ejection system in fluid communication with the source of the second gas and the outlet of the fuel cell; and (6) a member having an area defining a first bore, an area defining a second bore, and an area defining a passageway contained therein, the passageway in fluid communication with the first bore and the second bore, the injection system and the ejection system in fluid communication with the passageway, the injection system in physical cooperation with the first bore, and the ejection system in physical cooperation with the second bore; wherein the injection system selectively injects the first gas into the passageway to form a pulsed first gas stream; wherein the second gas is drawn into the passageway in response to the pulsed first gas stream to form a pulsed second gas stream; wherein the pulsed first gas stream and the pulsed second gas stream combine to form a gas mixture; wherein the gas mixture is introduced into the inlet of the at least one fuel cell.

Further areas of applicability of the present invention will become apparent from the detailed description provided hereinafter. It should be understood that the detailed description and specific examples, while indicating certain embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following description of the embodiments of the invention directed to an injector/ejector system for a fuel cell is merely exemplary in nature and is in no way intended to limit the invention, or its application and uses.

Figure 1:
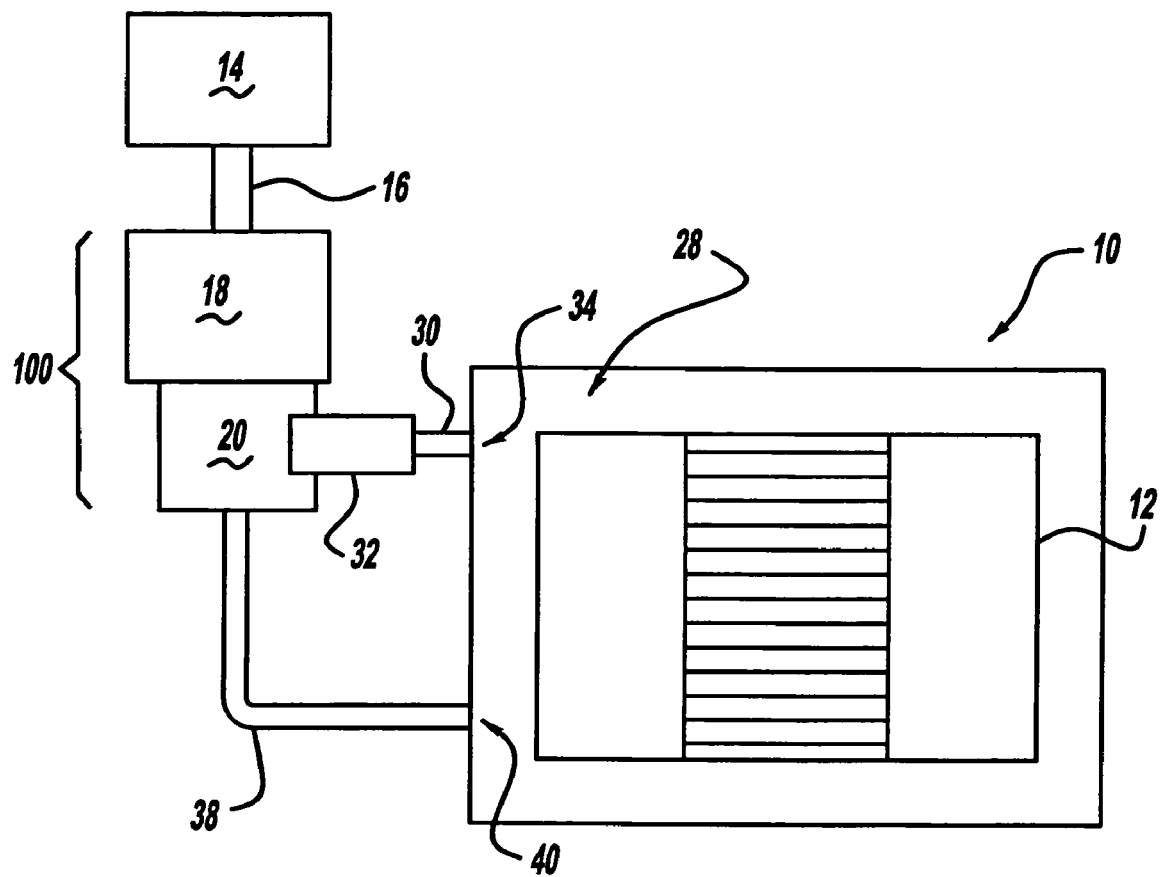
FIG. 1 is a schematic illustration of a fuel cell system, in accordance with the general teachings of the present invention.
Figure 2:
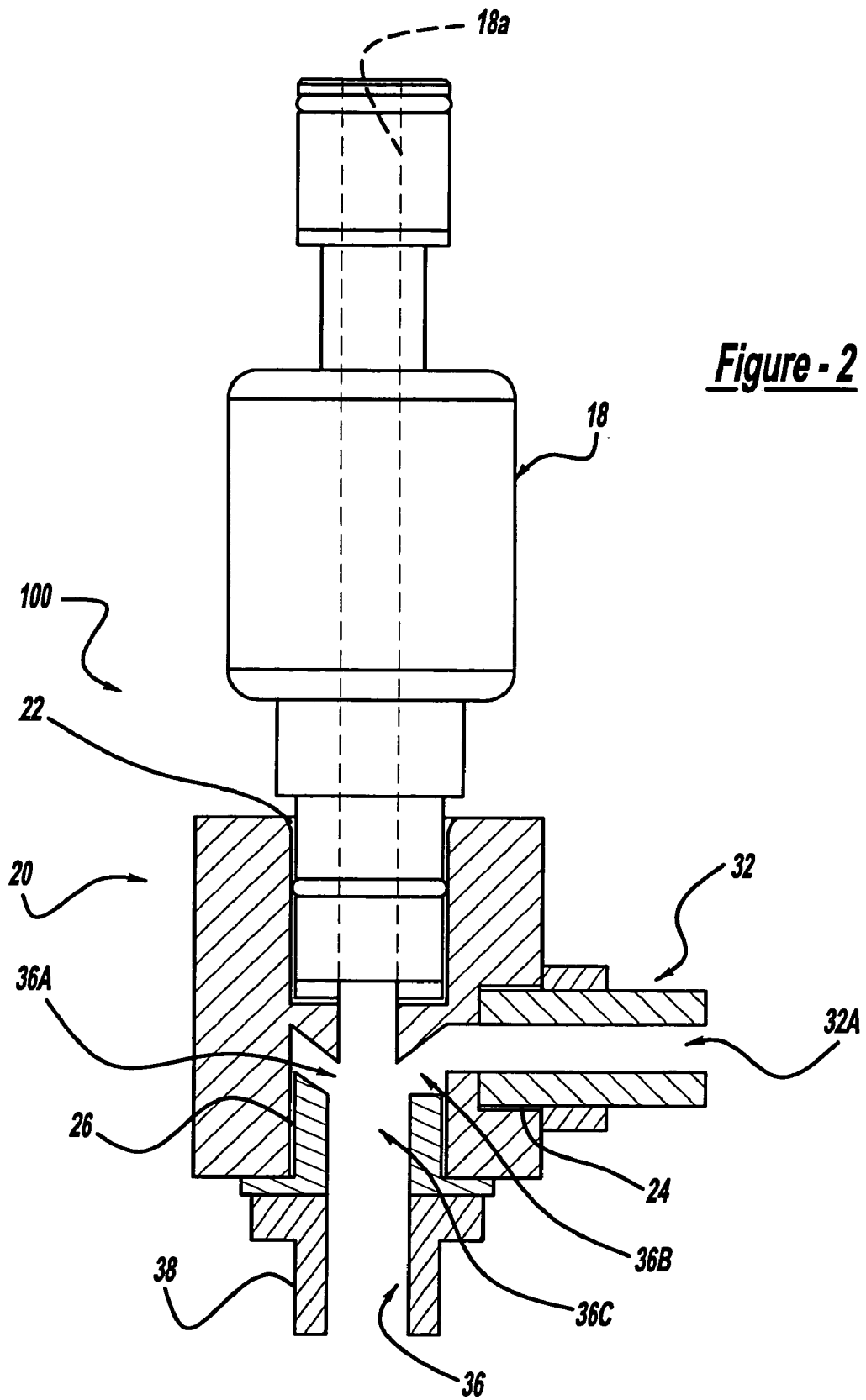
FIG. 2 is a sectional illustration of a combined injector/ejector system for a fuel cell system, in accordance with one embodiment of the present invention.

Referring to FIGS. 1 and 2, there is shown a schematic illustration of a fuel cell system 10, in accordance with the general teachings of the present invention, as well as a sectional illustration of a combined injector/ejector system 100 for use in conjunction with the fuel cell system 10, in accordance with one embodiment of the present invention.

The fuel cell system 10 includes at least one fuel cell 12, and generally a plurality of fuel cells, referred to as a stack. A first gas source 14, such as a pressurized $H_2$ tank on a vehicle, is provided for storing a pressurized gas, such as, but not limited to, hydrogen ($H_2$). An optional conduit 16 is provided in fluid communication with the first gas source 14.

An injector system 18 is provided for regulating the flow of the first gas, wherein the injector system 18 is in fluid communication with either or both the first gas source 14 and/or the optional conduit 16. The injector system 18 includes a concentric through bore 18A formed therein for permitting fluid flow therethrough. A coupling member 20 is provided in physical cooperation with at least a portion of a surface of the injector system 18. The coupling member 20 includes at least one area defining a bore. In this embodiment, the coupling member 20 includes three bores 22, 24, and 26. The injector system 18 is in physical cooperation with at least one of bores 22, 24, or 26, and particularly the bore 22.

A second gas source 28 is provided for storing or otherwise containing a second gas, such as, but not limited to hydrogen ($H_2$), nitrogen ($N_2$), water vapor ($H_2O$), and combinations thereof. In one embodiment, the second gas source 28 provides the exhaust gas from the anode outlet of the fuel cell 12. The second gas is not required to be under pressure. An optional conduit 30 is provided in fluid communication with second gas source 28.

An ejector system 32 is provided for ejecting the second gas into the coupling member 20 from a fuel cell outlet 34. The ejector system 32 includes a concentric through bore 32A formed therein for permitting fluid flow therethrough. The ejector system 32 is in physical cooperation with at least a portion of a surface of the coupling member 20. The ejector system 32 is preferably in physical cooperation with at least one of the bores 22, 24, or 26, and particularly the bore 24.

A passageway 36 is formed within the coupling member 20, wherein the passageway 36 is in fluid communication with at least one of the bores 22, 24, or 26, and particularly all three of the bores 22, 24, and 26.

An optional conduit 38 is provided for conveying any gases in or near the passageway 36 back to an anode inlet 40 of the fuel cell 12. The optional conduit 38 is in physical cooperation with at least one of the bores 22, 24, or 26, and particularly with the bore 26.

The combined injector/ejector system 100 includes the injector system 18, the coupling member 20, and the ejector system 32. However, it should be appreciated that other optional components (e.g., seals, conduits, pipes, valves, and the like), including those discussed above, could be incorporated into the injector/ejector system 100. Furthermore, it should be appreciated that although the injector system 18, the coupling member 20, and the ejector system 32 are shown as being separate and discrete components, two or more of these components can be formed integrally, such that, for example, the need for the coupling member 20 can be eliminated. By way of a non-limiting example, a unitary member could be molded (e.g., from plastic materials) or cast (e.g., from metallic materials) to form a member that achieves the function of the injector system 18 and the ejector system 32, while providing the requisite conduits, bores, and/or passageways for enabling fluid flow through the unitary member.

Regardless of the actual configuration of the injector/ejector system 100, it is envisioned that the injector/ejector system 100 will be more compact than conventional fuel system injectors and ejectors. Additionally, it is envisioned that the requirement for conduits and pipes between the injector system 18 and the ejector system 32 will be substantially decreased by virtue of the design of the injector/ejector system 100.

The $H_2$ supply for the fuel cell system 10 is typically stored under relatively high pressure and is selectively injected into the fuel cell system 10 by the action of the injector system 18. The $H_2$ supply is regulated by a regulating device (e.g., a valve) such as digital-injector, which is known in the art. The regulating device may be incorporated into the injector system 18, or may be comprised of a separate component.

The valve oscillates between an open position and a closed position. It changes between these positions relatively quickly, typically between 10 and 60 Hz, usually, but not necessarily, constantly. The duration of the open position is variable. The duty cycle, i.e., the time-relation between the open and closed position, is proportional to the flow rate. The pressure will necessarily pulsate. However, as long as the pressure is measured far enough away from the injector system 18, the pulsations cannot be measured anymore.

Thus, energy in the form of pressure is available from the $H_2$ supply. In accordance with the general teachings of the present invention, this energy, in the form of pressure, will preferably be used to pump, propel, or otherwise deliver the gases from the outlet 34 and/or the ejector system 32 back into the injector system 18 and/or the coupling member 20, and eventually back into the inlet 40. In this manner, the need for a separate pumping device for the ejector system 32, and any associated conduits, is eliminated or at least lessened, thus saving energy input into the fuel cell system 10, which therefore increases the overall energy efficiency of the fuel cell system 10.

The intended operation of fuel cell system 10, and specifically injector/ejector system 100, will be explained with reference to FIGS. 3A-3H.

Figure 3A:
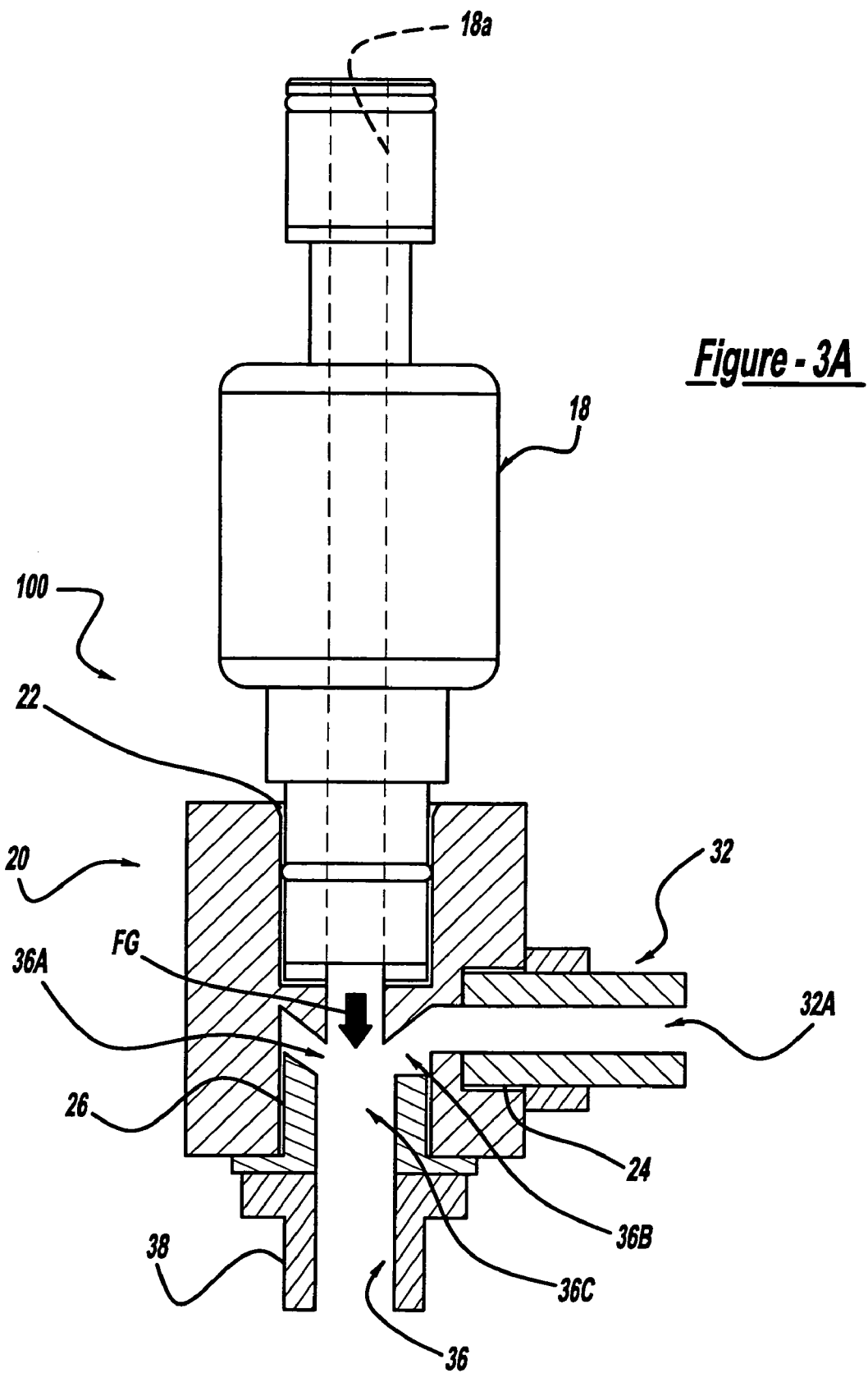
FIG. 3A is a sectional illustration of the combined injector/ejector system wherein a pulsed stream of a first gas from the injector is injected into a passageway connecting the injector and ejector system, in accordance with one embodiment of the present invention.

Referring to FIG. 3A, there is a fragmentary sectional illustration of the injector/ejector system 100 wherein a pulsed (i.e., non-continuous) stream of a first gas (e.g., hydrogen) FG from the first gas source 14 is injected into the upper portion 36A of the passageway 36 by the action of the injector system 18, in accordance with one embodiment of the present invention. The pulsed stream of the first gas can oscillate between 0% flow and 100% flow.

Figure 3B:
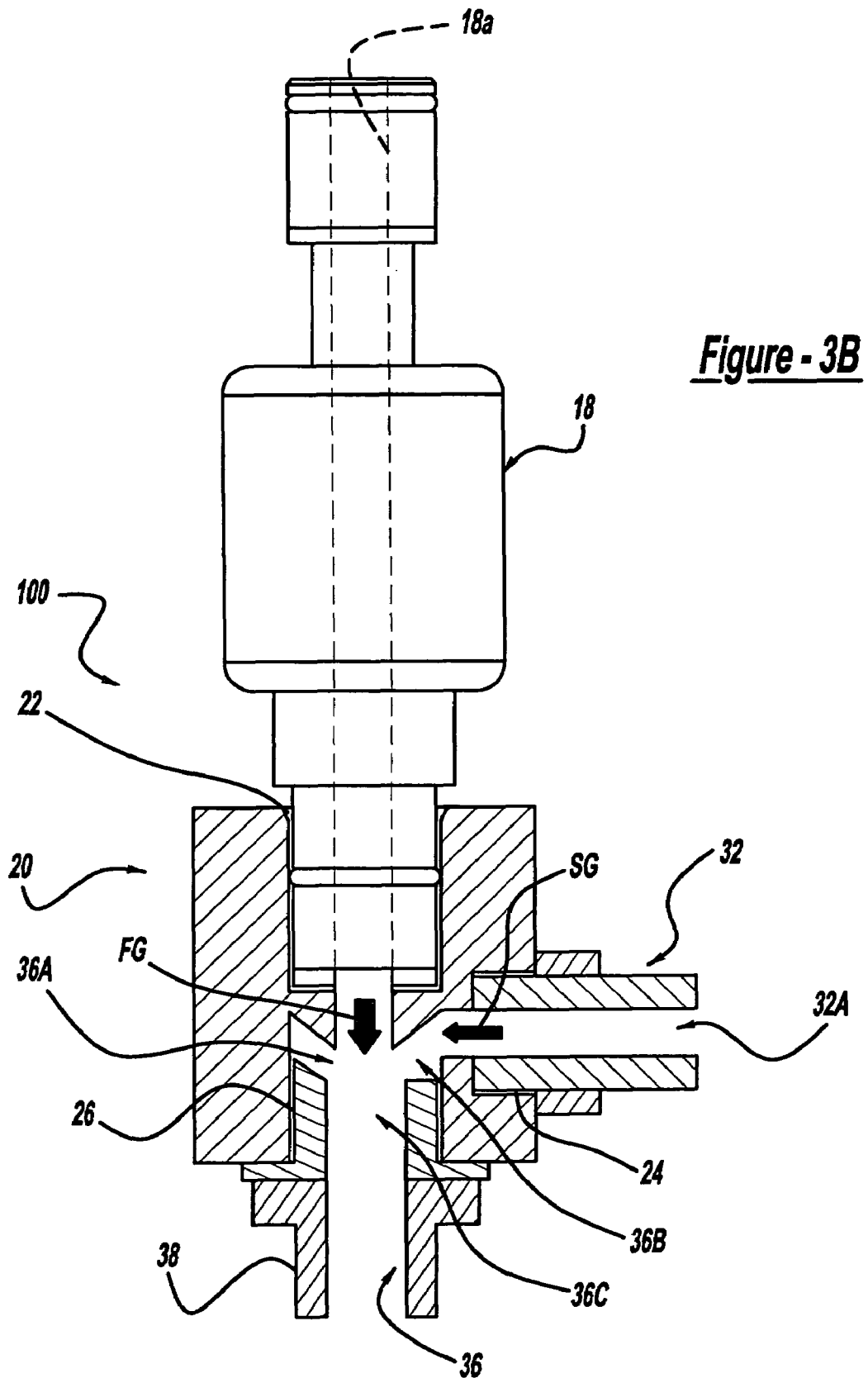
FIG. 3B is a sectional illustration of the combined injector/ejector system wherein a pulsed stream of a second gas is drawn into the passageway connecting the injector and ejector system in response to the pulsed stream of the first gas, in accordance with one embodiment of the present invention.

Referring to FIG. 3B, there is shown a fragmentary sectional illustration of the injector/ejector system 100 wherein a pulsed (i.e., non-continuous) stream of a second gas SG is drawn or otherwise induced into the upper portion 36B of the passageway 36 in response to the pulsed stream of the first gas FG, in accordance with one embodiment of the present invention.

Figure 3C:
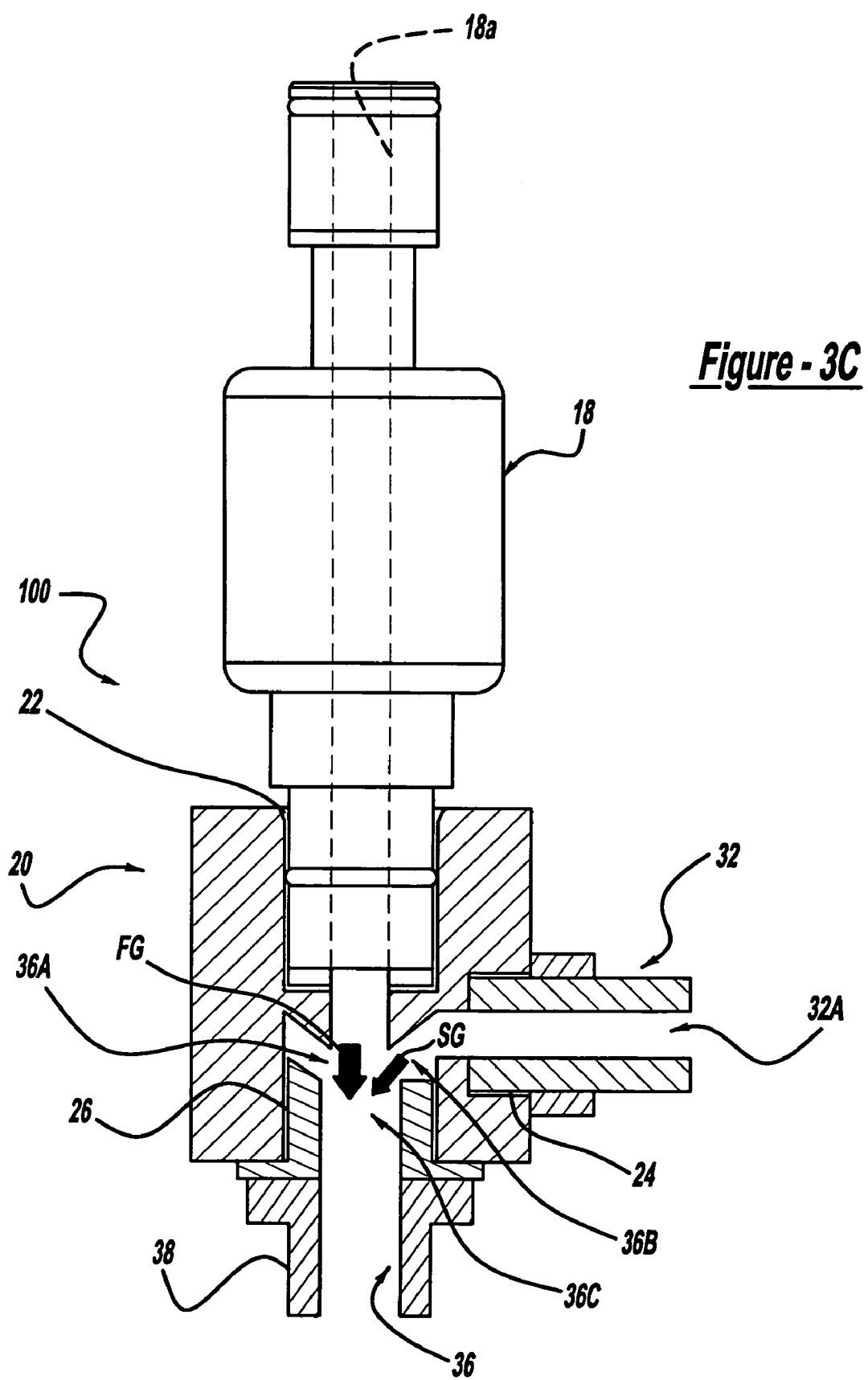
FIG. 3C is a sectional illustration of the combined injector/ejector system wherein the pulsed streams of the first and second gases combine and mix in the passageway connecting the injector and ejector system, in accordance with one embodiment of the present invention.

Referring to FIG. 3C, there is shown a fragmentary sectional illustration of the injector/ejector system 100 wherein the pulsed stream of the first gas FG and the pulsed stream of the second gas SG combine and preferably, although not necessarily, mix in proximity to the upper portion 36C of the passageway 36, in accordance with one embodiment of the present invention. Thus, the pulsed stream of the first gas FG and the pulsed stream of the second gas SG are brought into contact and permitted to mix in proximity to the area of the ejector system 32 and/or the upper portions 36A, 36B, and/or 36C of the passageway 36. Without being bound to a particular theory of the operation of the present invention, the respective gas streams mix and/or combine prior to be introduced into the fuel cell system 10.

Figure 3D:
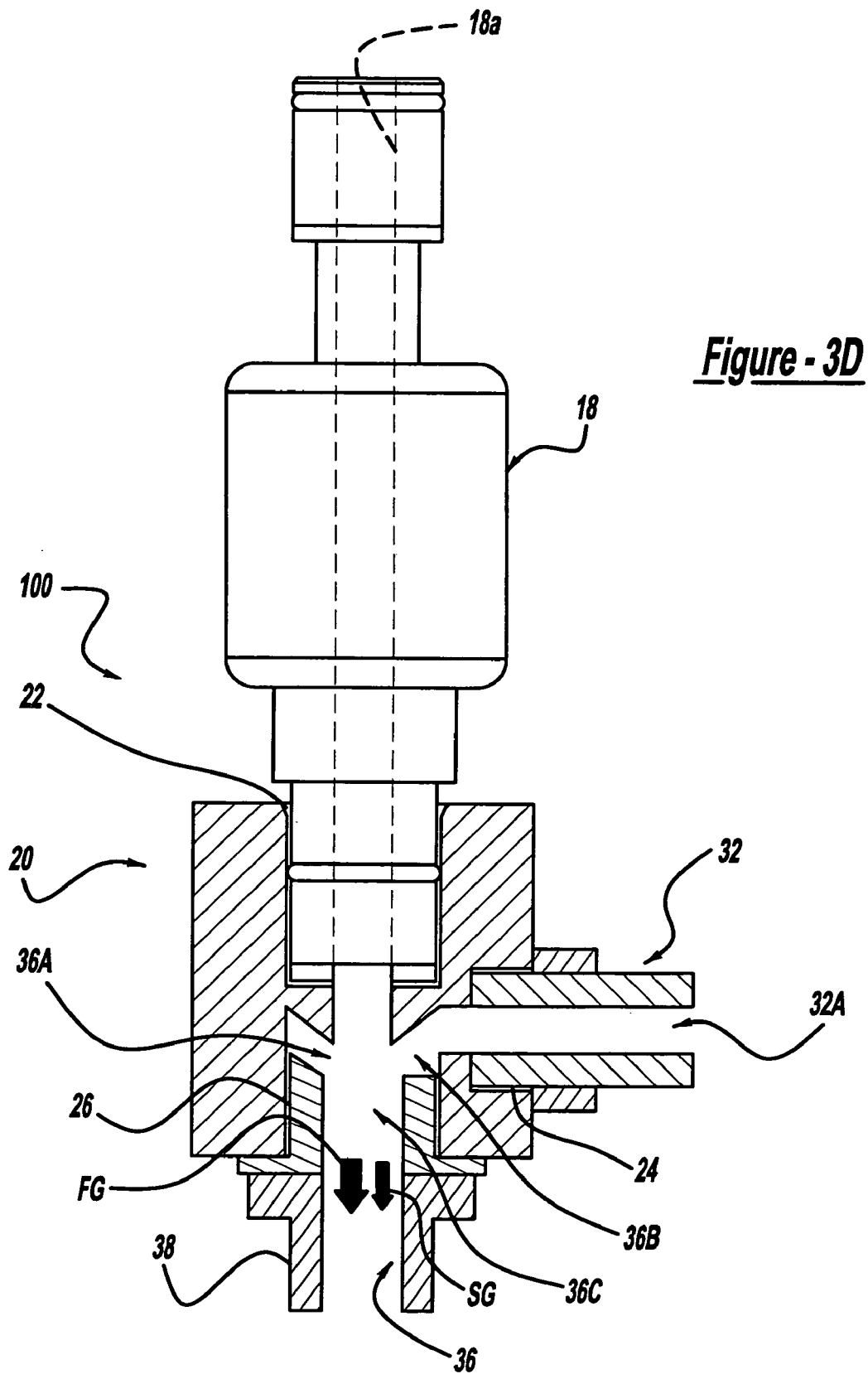
FIG. 3D is a sectional illustration of the combined injector/ejector system wherein the combined pulsed streams of the first and second gases are propelled further down the passageway connecting the injector and ejector system towards the inlet of the fuel cell system, in accordance with one embodiment of the present invention.

Referring to FIG. 3D, there is shown a fragmentary sectional illustration of the injector/ejector system 100 wherein the combined pulsed stream of the first gas stream FG and the second gas stream SG are propelled further down the passageway 36 towards the inlet 40 of the fuel cell system 10, in accordance with one embodiment of the present invention.

Figure 3E:
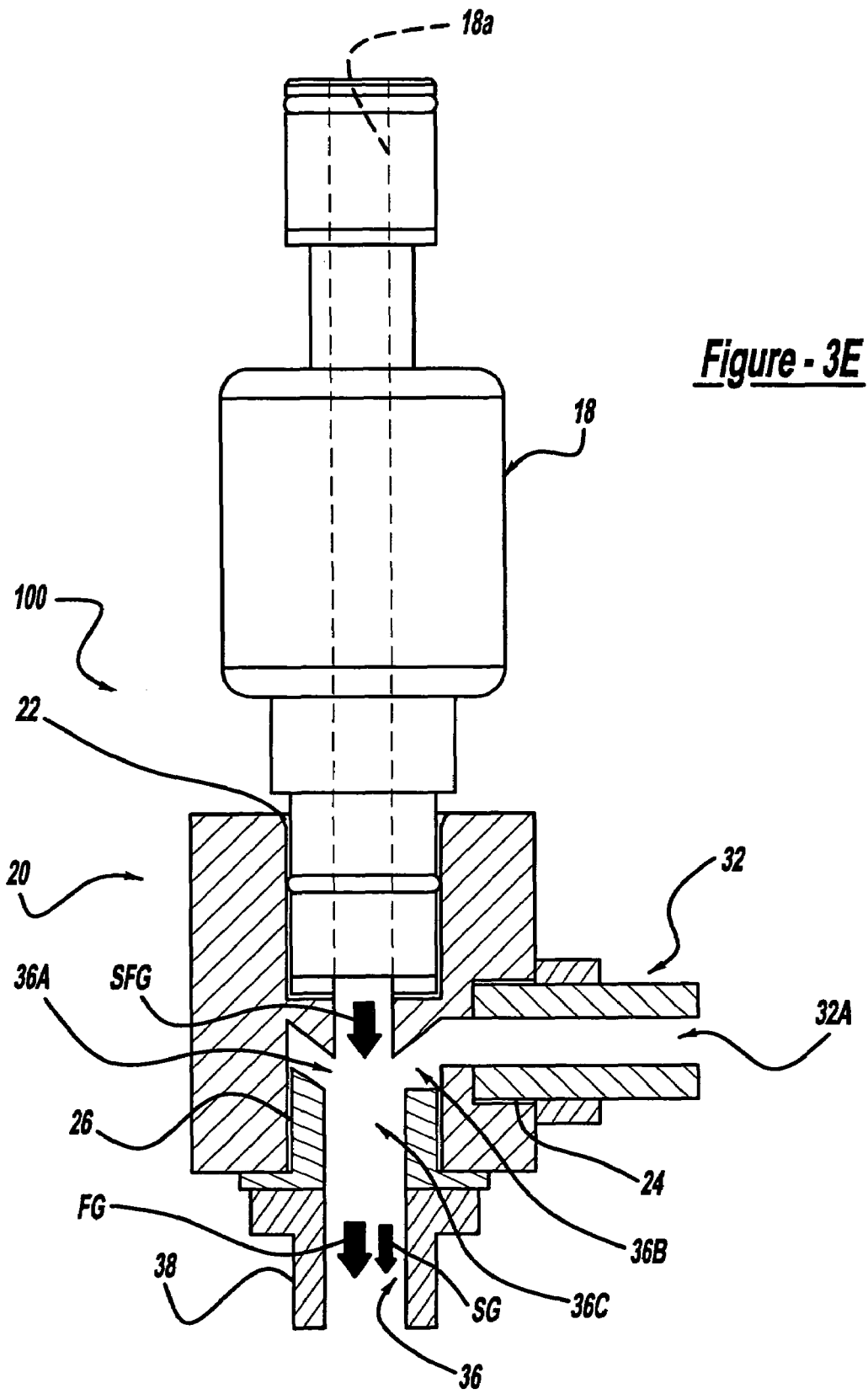
FIG. 3E is a sectional illustration of the combined injector/ejector system wherein a second pulsed stream of the first gas from injector is injected into the passageway connecting the injector and ejector system, in accordance with one embodiment of the present invention.

Referring to FIG. 3E, there is a fragmentary sectional illustration of the injector/ejector system 100 wherein a second pulsed (i.e., non-continuous) stream of a first gas (e.g., hydrogen) SFG from the first gas source 14 is injected into the upper portion 36A of the passageway 36 by the action of the injector system 18, in accordance with one embodiment of the present invention. Again, the pulsed stream of the second gas can oscillate between 0% flow and 100% flow.

Figure 3F:
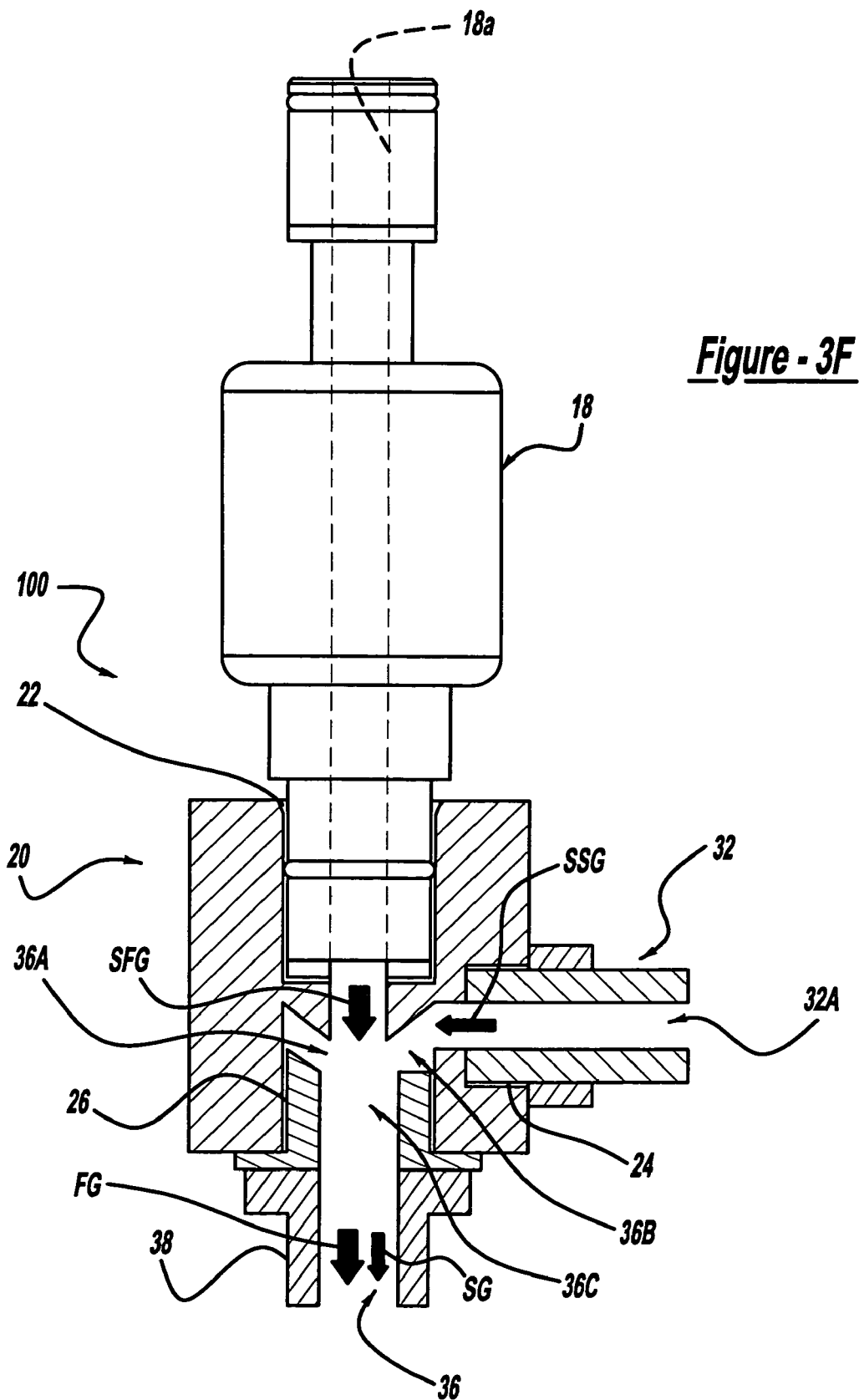
FIG. 3F is a sectional illustration of the combined injector/ejector system wherein a second pulsed stream of the second gas is drawn into the passageway connecting the injector and ejector system in response to the second pulsed stream of the first gas, in accordance with one embodiment of the present invention.

Referring to FIG. 3F, there is shown a fragmentary sectional illustration of the injector/ejector system 100 wherein a second pulsed (i.e., non-continuous) stream of a second gas SSG is drawn or otherwise induced into the upper portion 36B of the passageway 36 in response to the second pulsed stream of the first gas SFG, in accordance with one embodiment of the present invention.

Figure 3G:
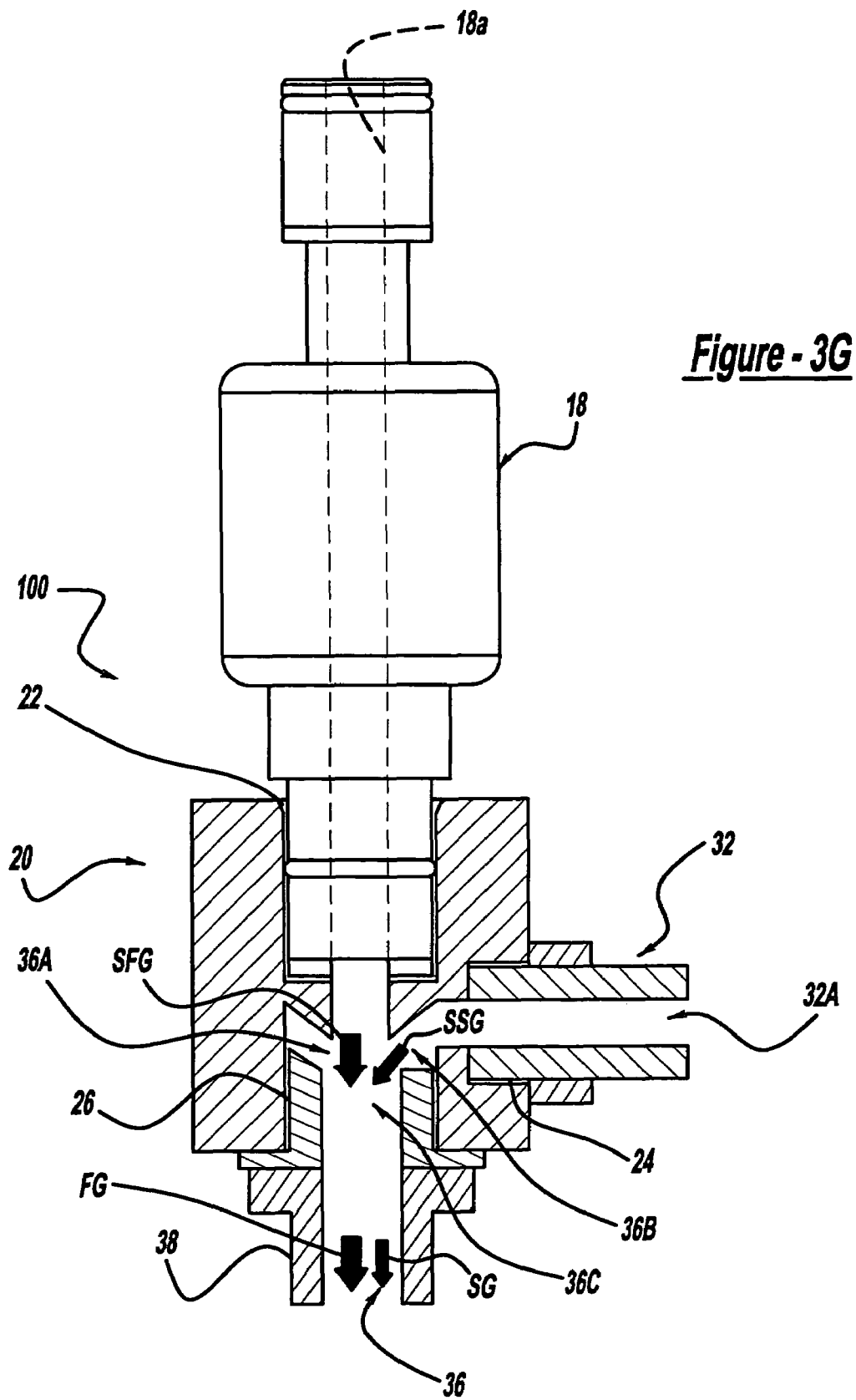
FIG. 3G is a sectional illustration of the combined injector/ejector system wherein the second pulsed stream of the first gas and the second pulsed stream of the second gas combine and mix in the passageway connecting the injector and ejector system, in accordance with one embodiment of the present invention.

Referring to FIG. 3G, there is shown a fragmentary sectional illustration of the injector/ejector system 100 wherein the second pulsed stream of the first gas SFG and the second pulsed stream of the second gas SSG combine and mix in the upper portion 36C of the passageway 36, in accordance with one embodiment of the present invention. Thus, the pulsed stream of the first gas FG and the pulsed stream of the second gas SG are brought into contact and permitted to mix in proximity to the area of the ejector system 32 and/or the upper portions 36A, 36B, and/or 36C of the passageway 36. Without being bound to a particular theory of the operation of the present invention, it is preferred that the respective gas streams mix and/or combine prior to be introduced into the fuel cell system 10.

Figure 3H:
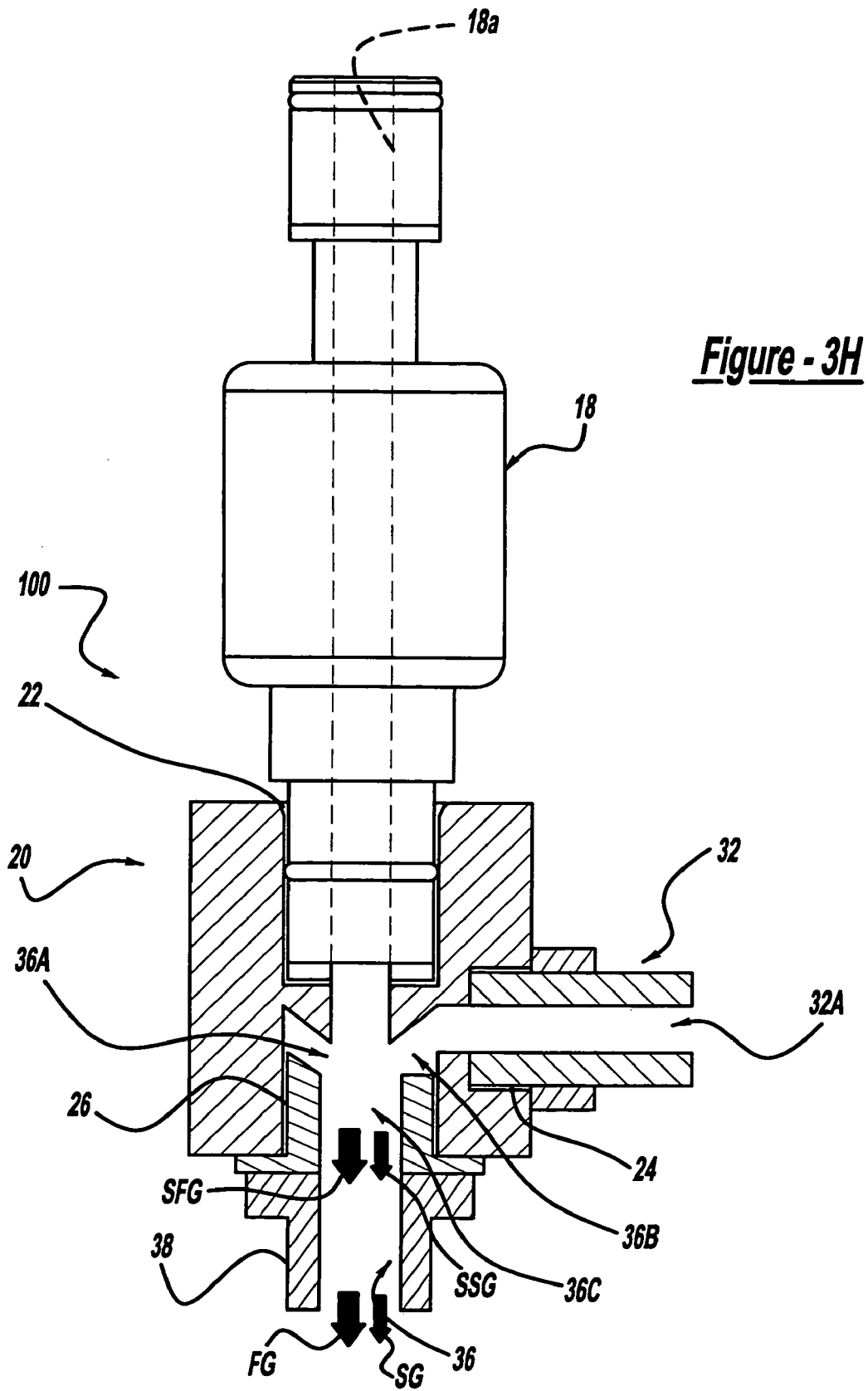
FIG. 3H is a sectional illustration of the combined injector/ejector system wherein the combined second pulsed streams of the first gas stream and the second gas stream are propelled further down the passageway towards the inlet of the fuel cell system, in accordance with one embodiment of the present invention.

Referring to FIG. 3H, there is shown a schematic illustration of the injector/ejector system 100 wherein the combined second pulsed streams of the first gas stream SFG and the second gas stream SSG are propelled further down the passageway 36 towards the inlet 40 of the fuel cell system 10, in accordance with one embodiment of the present invention.

In practice, this procedure would be selectively and sequentially repeated as a means of transporting or otherwise conveying the second gas stream from the ejector system 32 into the passageway 36. Without being bound to a particular theory of the operation of the present invention, it is believed that the pressure energy of the pulsed introduction of the first gas stream into the passageway 36 is sufficient to act as a pumping mechanism to draw or otherwise induce the second gas stream from the ejector system 32 into the passageway 36.

Figure 4:
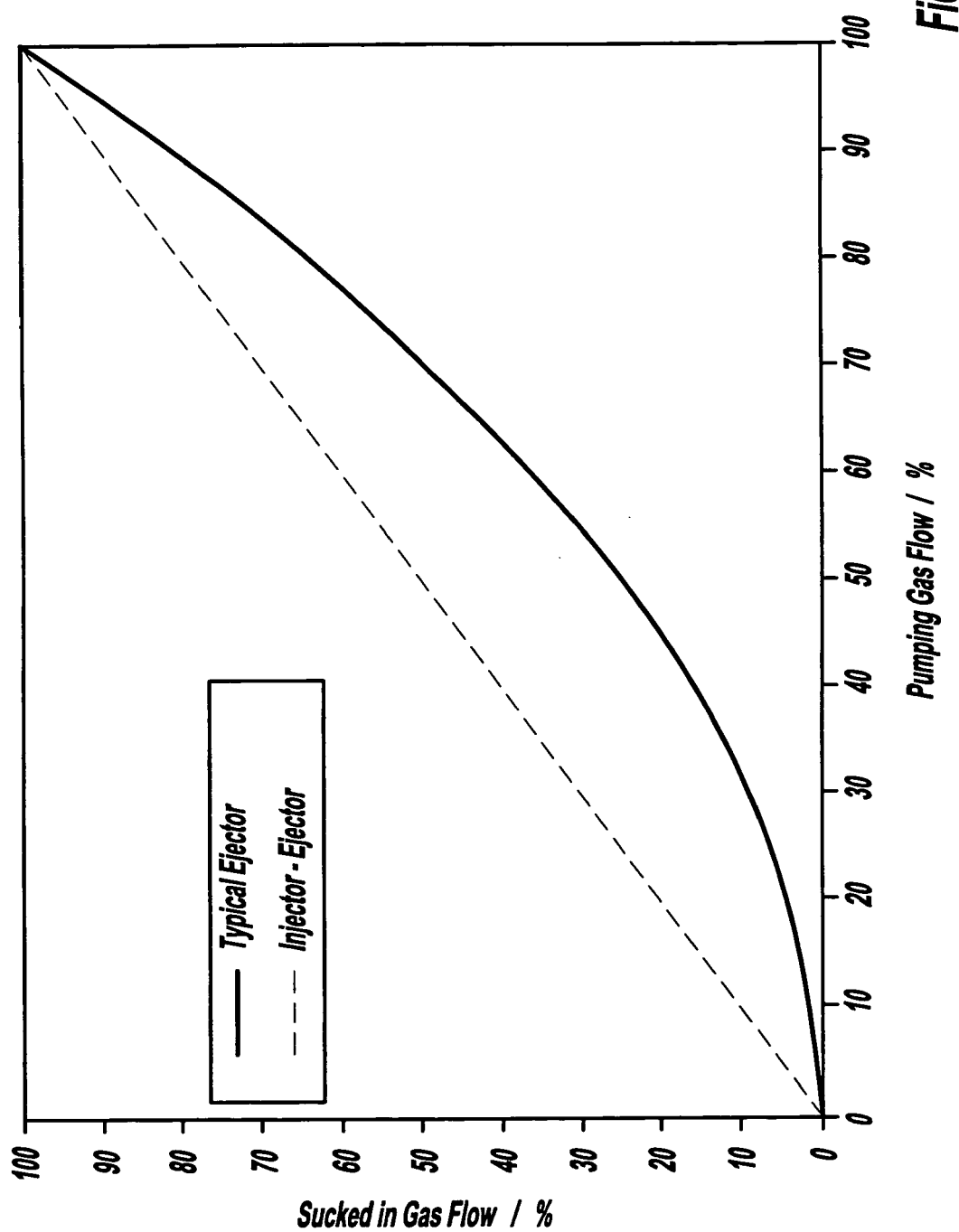
FIG. 4 is a graphical illustration of a comparative test of ejector efficiency between a conventional fuel cell ejector and the combined injector/ejector system of the present invention.

Referring to FIG. 4, there is shown a graphical illustration of a comparative test of ejector efficiency between a conventional fuel cell ejector and the combined injector/ejector system 100 of the present invention. In this view, it is clear that the methodology and apparatus of the injector/ejector system 100 of the present invention provides significant advantages over conventional ejector systems when comparing pumping gas flow percentage and its relationship to sucked in gas flow percentage.

Therefore, a first advantage of the pulsed pumping of the first gas stream, in conjunction with the injector/ejector system 100 of the present invention, is that it is more efficient than a conventional ejector that is being continuously motivated at regulated pressure. Thus, a conventional ejector would have a sucked in gas flow percentage roughly equal to the square of the motive gas flow percentage. Conversely, the injector/ejector system 100 using pulsed gas flow would have a sucked in gas flow percentage roughly equal to 100% motive gas flow percentage multiplied by the pumping gas flow percentage.

Accordingly, part load efficiency is improved by the present invention. An ejector can only operate optimally in one operating point. Therefore, if the pressure of the motive gas is reduced, the pumping effect breaks down rapidly, because the relationship between motive flow and pumped flow is not linear as shown in FIG. 4 (e.g., halving the hydrogen gas flow rate make less than half the pumping rate). However, in accordance with the general teachings of the present invention, by making the injector produce a pulsating gas stream near its outlet, where the ejector is located, a higher gas pump rate results than it would if the same hydrogen gas flow would be continuous, as in conventional fuel cell systems.

As discussed above, the flow of the hydrogen from the source 14 across the opening of the bore 32A to the passageway 36 draws the nitrogen, hydrogen and water vapor mixture from the anode exhaust through the bore 32A into the passageway 36 where it is mixed with the supply hydrogen. The duty cycle or pulse rate of the injector system 18 determines how much hydrogen is provided at the anode input of the fuel cell 12 depending on the load demand.

However, the pressure of the hydrogen provided by the source 14 is constant regardless of the pulse rate of the injector system 18. Therefore, there is a limit as to how much motive force the flow of hydrogen from the injector system 18 is able to provide to draw the hydrogen, nitrogen and water vapor mixture through the bore 32A. Particularly, because hydrogen is a very thin gas, the density of the hydrogen supply gas may be significantly below the density of the gas mixture in the anode exhaust gas reducing or eliminating the ability of the hydrogen flow to draw the anode exhaust gas through the bore 32A. Thus, for some times during system operation, the higher density anode exhaust gas in the bore 32A may prevent the hydrogen from the ejector system 18 from effectively drawing the anode exhaust gas from the fuel cell 12.

According to another embodiment of the present invention, the pressure of the hydrogen gas applied to the injector system 18 is controlled so that the pressure of the hydrogen can be increased to increase its density for effectively drawing the anode exhaust gas through the bore 32A depending on the pressure and constituency of the anode exhaust gas.

Figure 5:
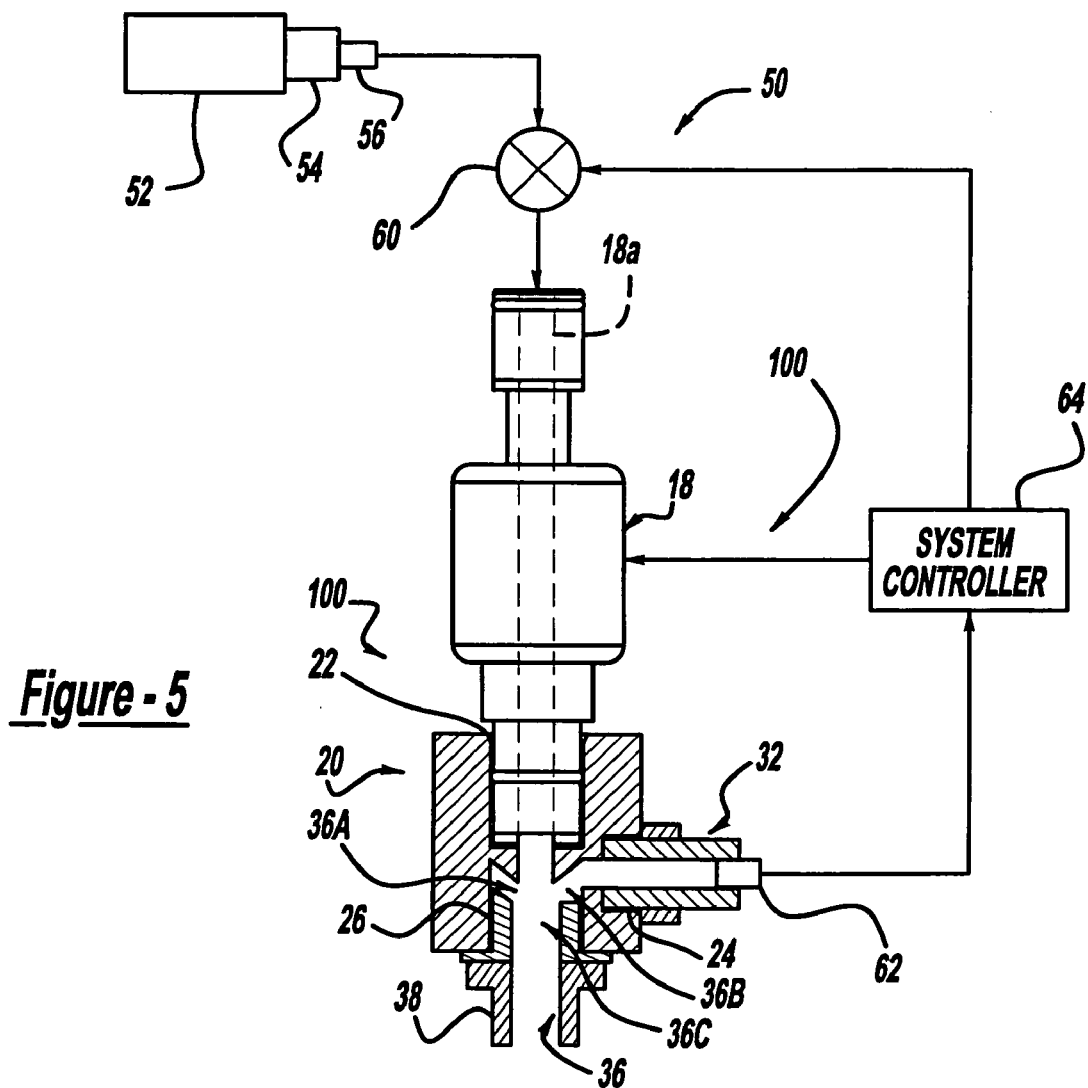
FIG. 5 is a plan view, including a cross-sectional portion, of a fuel cell system including an injector/ejector system and a supply pressure controller, according to another embodiment of the present invention.

FIG. 5 is a plan view of a fuel cell system 50 that includes the injector/ejector system 100 discussed above. In this embodiment, hydrogen supply gas is stored in a hydrogen tank 52, such as a GH2 hydrogen tank on a vehicle. When the tank 52 is full or nearly full, the pressure therein can be 600 bar or more. The present invention proposes using this pressure to increase the pressure of the hydrogen gas sent to the injector/ejector system 100 to better draw the anode exhaust gas through the bore 32A. A pressure regulator 54 is provided at the outlet of the tank 52 to reduce the pressure of the hydrogen being emitted from the tank 52 and sent to a pipe 58 to a relatively high pressure, such as 20 bar. In the known fuel cell systems, the hydrogen supply pressure was reduced by the pressure regular 54 to a significantly low pressure, about 2 bar, thus wasting valuable energy within the compressed gas. A flow-restricting pin-hole orifice 56, such as a washer, is provided adjacent to the pressure regulator 52 in the pipe 58 as a safety mechanism to prevent a significant portion of hydrogen from escaping from the tank 52 in the event that the pipe 58 ruptures before the leak can be detected and the regulator 54 turned off. Therefore, a significant portion of combustible hydrogen will not enter the engine compartment of the vehicle before the hydrogen leak is detected.

The high-pressure hydrogen flowing through the pipe 58 is sent to a pressure controller 60. The pressure controller 60 is a known variable pressure controller device that selectively adjusts the hydrogen supply pressure before it is sent to the injector system 18. A sensor 62 is positioned in the bore 32A, or other suitable location in the anode exhaust line, to detect the density of the anode exhaust gas, and detect the constituents therein. The sensor 62 provides a signal to a system controller 64 indicative of the density of the anode exhaust gas, and the amount of water vapor and nitrogen therein. Based on a predetermined algorithm, the system controller 64 controls the pressure controller 60 so that proper amount of hydrogen pressure from the tank 52 is provided into the passageway 36 to effectively draw the anode exhaust gas through the bore 32A. Particularly, as the density of the anode exhaust goes up and down, the pressure controller 60 will increase or decrease the supply pressure accordingly, so that the proper pressure is applied across the bore 32A to effectively draw the anode exhaust gas.

The system controller 64 also controls the duty cycle of the injector 18 to provide the proper amount of hydrogen to the fuel cell 12 depending on the current load demand. In other words, if the pressure is increased by the pressure controller 60 because the density of the exhaust gas goes up, then the system controller 64 may reduce the duty cycle of the injector system 18 for the same load demand.

Therefore, a second advantage of the pulsed pumping of the first stream, in conjunction with the injector/ejector system 100 of the present invention, is improved fuel utilization. Nitrogen is removed from the re-circulation loop by venting to atmosphere. Because such venting is not selective, any excess hydrogen fuel will also be vented with the nitrogen. This method does not require excess hydrogen mass flow to re-circulate increased nitrogen loading.

Figure 6:
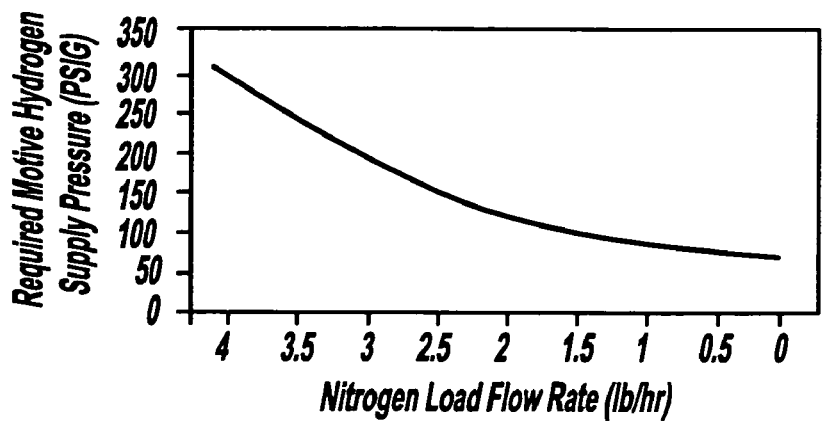
FIG. 6 is a graph with nitrogen load flow rate on the horizontal axis and required mode of hydrogen supply pressure on the vertical axis showing the hydrogen supply pressure required to draw the anode exhaust for a particular nitrogen load flow rate.

Nitrogen is the dominant material in the anode exhaust gas that affects its density. FIG. 6 is a graph with nitrogen load flow rate on the horizontal axis and required motive hydrogen supply pressure on the vertical axis that shows the required supply pressure for a particular nitrogen flow rate to provide the proper pressure control by the controller 60.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A combined injector/ejector system for a fuel cell system, said system comprising:
   a gas injection system;
   a gas ejection system; and
   a member having an area defining a passageway contained therein, the gas injection system and the gas ejection system being in fluid communication with the passageway, wherein the injection system is operable to selectively inject a first gas into the passageway to form a pulsed first gas stream, and wherein a second gas is drawn into the passageway in response to the pulsed first gas stream from the gas ejection system to form a pulsed second gas stream.

2. The injector/ejector system according to claim 1 wherein the first gas is pressurized.

3. The injector/ejector system according to claim 1 wherein the first gas is hydrogen.

4. The injector/ejector system according to claim 1 wherein the second gas is selected from the group consisting of hydrogen, nitrogen, water vapor, and combinations thereof.

5. The injector/ejector system according to claim 1 wherein the pulsed first gas stream and the pulsed second gas stream combine to form a gas mixture.

6. The injector/ejector system according to claim 5 further comprising at least one fuel cell having an anode inlet and an anode outlet.

7. The injector/ejector system according to claim 6 wherein the gas injection system is in fluid communication with the inlet of the at least one fuel cell.

8. The injector/ejector system according to claim 6 wherein the gas ejection system is in fluid communication with the outlet of the at least one fuel cell.

9. The injector/ejector system according to claim 6 wherein the gas mixture is introduced into the inlet of the at least one fuel cell.

10. The injector/ejector system according to claim 1 wherein the member includes an area defining a first bore and an area defining a second bore, wherein the passageway is in fluid communication with the first bore and the second bore.

11. The injector/ejector system according to claim 10 wherein the injection system is in physical cooperation with the first bore.

12. The injector/ejector system according to claim 10 wherein the ejection system is in physical cooperation with the second bore.

13. The injector/ejector system according to claim 1 further comprising a pressure controller, said pressure controller controlling the pressure of the first gas applied to the gas injection system.

14. The injector/ejector system according to claim 13 further comprising a sensor positioned to sense the density of the second gas, wherein the pressure controller controls the pressure of the first gas based on the density of the second gas.

15. The injector/ejector system according to claim 14 further comprising a pin-hole orifice positioned in the pipe between the pressurized tank and the pressure controller.

16. The injector/ejector system according to claim 13 further comprising a pressurized tank for storing the first gas, wherein the pressurized first gas from the tank is delivered to the pressure controller through a pipe.

17. A fuel cell system comprising:
at least one fuel cell including an anode inlet and an anode outlet;
a source of hydrogen gas for providing hydrogen to the anode inlet;
an injection system in fluid communication with the source of the hydrogen gas and the inlet of the fuel cell;
an ejection system in fluid communication with the anode outlet of the fuel cell; and
a member having an area defining a passageway contained therein, the injection system and the ejection system being in fluid communication with the passageway, wherein the injection system selectively injects the hydrogen gas into the passageway to form a pulsed first gas stream, and wherein an anode exhaust gas from the anode outlet is drawn into the passageway in response to the pulsed hydrogen gas, so that the hydrogen gas and the anode exhaust gas are mixed and introduced into the anode inlet of the at least one fuel cell.

18. The fuel cell system according to claim 17 further comprising a pressure controller, said pressure controller controlling the pressure of the hydrogen gas applied to the gas injection system.

19. The fuel cell system according to claim 18 wherein the source of hydrogen gas is a tank for storing pressurized hydrogen, wherein the source of hydrogen gas delivers the hydrogen gas to the pressure controller at a high pressure.

20. The fuel cell system according to claim 19 wherein the hydrogen gas applied to the pressure controller has a pressure of about 20 bar.

21. The fuel cell system according to claim 18 further comprising a sensor for sensing the density of the anode exhaust gas, wherein the pressure controller is responsive to the density of the anode exhaust gas to selectively adjust the pressure of the hydrogen gas sent to the injection system.

22. The fuel cell system according to claim 18 further comprising a pin-hole orifice positioned between the pressurized tank and the pressure controller.

23. A fuel cell system comprising:
a fuel cell stack including an anode inlet and an anode outlet;
a pressurized tank storing a source of hydrogen gas;
a pressure controller in fluid communication with the pressurized tank and receiving pressurized hydrogen therefrom; and
an injector/ejector device in fluid communication with the pressure controller, the anode inlet and the anode outlet, said injector/ejector device including an injector and an ejector, wherein the injector is responsive to the hydrogen gas from the pressure controller and injects the hydrogen gas across an opening of the ejector so as to draw anode exhaust gas from the anode outlet into the injector/ejector device, and wherein the hydrogen gas and the anode exhaust gas are mixed in the injector/ejector device and introduced into the anode inlet.

24. The fuel cell system according to claim 23 further comprising a sensor for sensing the density of the anode exhaust gas, wherein the pressure controller is responsive to the density of the anode exhaust gas to selectively adjust the pressure of the hydrogen gas sent to the injector so as to effectively draw the anode exhaust gas into the injector/ejector device.

25. The fuel cell system according to claim 23 further comprising a pin-hole orifice positioned in a conduit that is in fluid communication with the pressurized tank and the pressure controller, said pin-hole orifice limiting the amount of hydrogen released from the fuel cell stack in the event that the conduit is ruptured.

26. The fuel cell system according to claim 23 wherein the injector/ejector device is a single integral unit.

27. The fuel cell system according to claim 23 wherein the hydrogen gas applied to the pressure controller has a pressure of about 20 bar.

* * * * *